(No Model.) 2 Sheets—Sheet 1.

H. K. JONES.
MANUFACTURE OF BOLTS OR PINS.

No. 446,739. Patented Feb. 17, 1891.

Witnesses:
John Edwards Jr.
W. H. Whiting.

Inventor
Horace K. Jones,
By James Shepard.
atty.

(No Model.) 2 Sheets—Sheet 2.

H. K. JONES.
MANUFACTURE OF BOLTS OR PINS.

No. 446,739. Patented Feb. 17, 1891.

Witnesses:
John Edwards Jr
W. H. Whiting.

Inventor
Horace K. Jones.
By James Shepard.
Atty.

UNITED STATES PATENT OFFICE.

HORACE K. JONES, OF HARTFORD, ASSIGNOR TO THE RUSSELL & ERWIN MANUFACTURING COMPANY, OF NEW BRITAIN, CONNECTICUT.

MANUFACTURE OF BOLTS OR PINS.

SPECIFICATION forming part of Letters Patent No. 446,739, dated February 17, 1891.

Application filed October 30, 1890. Serial No. 369,791. (No model.)

*To all whom it may concern:*

Be it known that I, HORACE K. JONES, a citizen of the United States, residing at Hartford, in the county of Hartford and State of Connecticut, have invented certain new and useful Improvements in the Manufacture of Bolts or Pins, of which the following is a specification.

My invention relates to improvements in the manufacture of bolts or pins; and the objects of my improvements are to produce enlargement-ribs upon a pin or bolt by rolling in dies, to facilitate the process of so doing, and to produce a new compound die.

Figure 1:
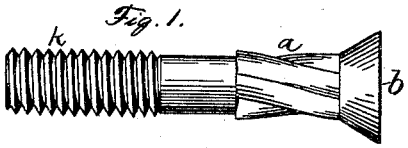
Figure 5:
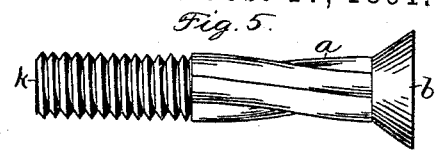
Figure 2:
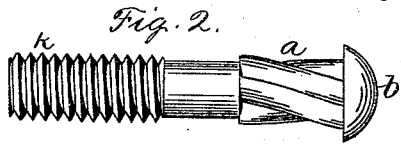
Figure 6:
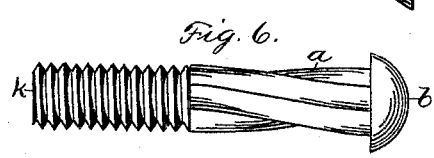
Figure 3:
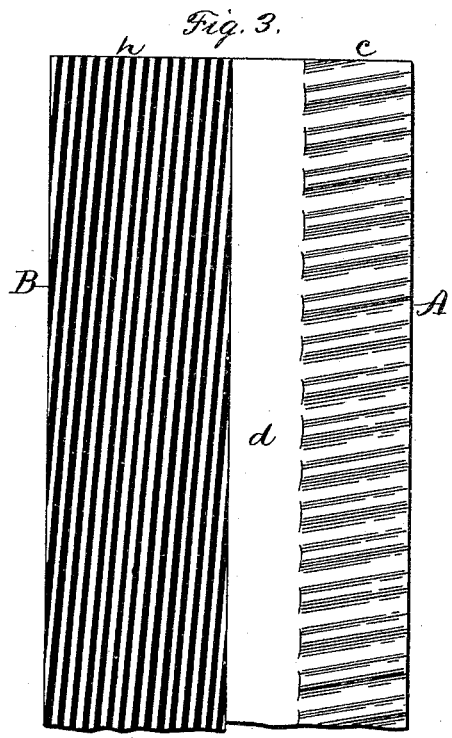
Figure 7:
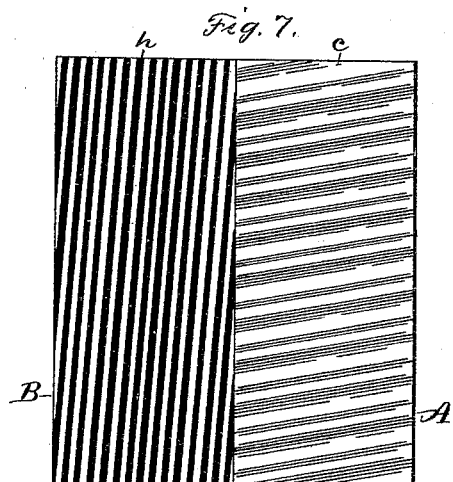
Figure 4:
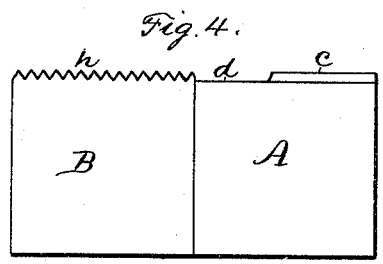
Figure 8:
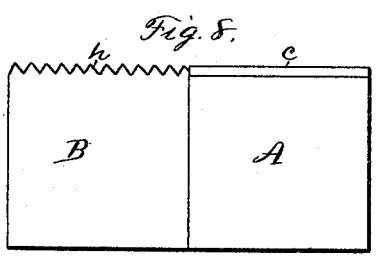
Figure 9:
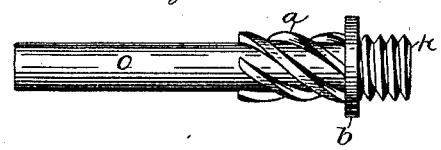
Figure 12:
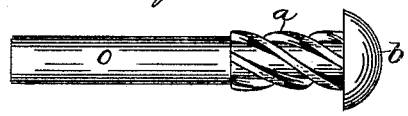
Figure 10:
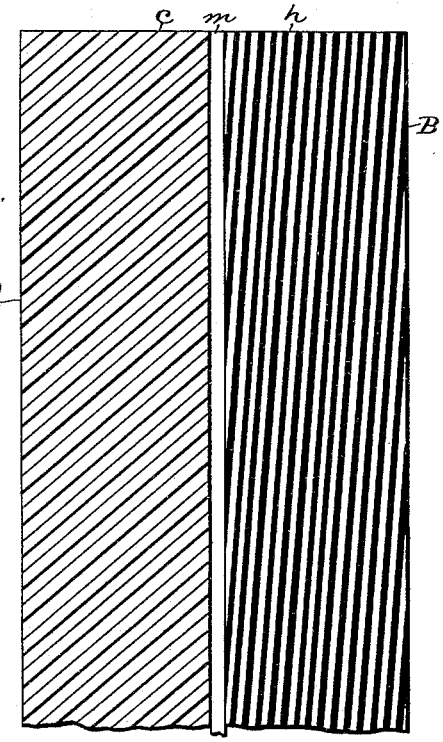
Figure 13:
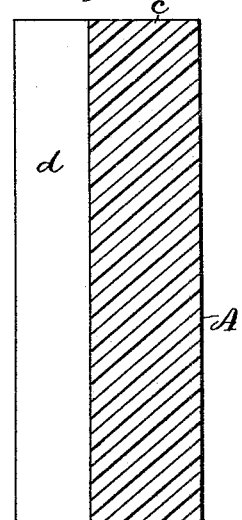
Figure 11:
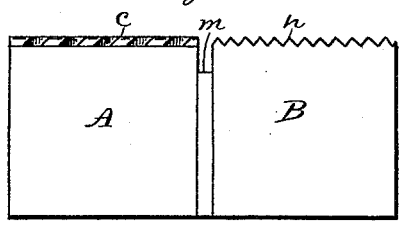
Figure 14:
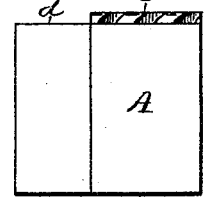

In the accompanying drawings, Figures 1 and 2 are side elevations of bolts with threads and enlargement-ribs rolled in accordance with my improvements. Fig. 3 is a face view of the major portion of the compound die for rolling said bolts. Fig. 4 is an end view of said die. Figs. 5 and 6 are side elevations of other bolts with threads and enlargement-ribs rolled in accordance with my improvements. Fig. 7 is a face view of the main portion of the compound die for rolling said bolts. Fig. 8 is an end view of the same. Fig. 9 is a side elevation of a pin for stove-door hinges with threads and enlargement ribs rolled in accordance with my improvements. Fig. 10 is a face view of the main portion of the compound die for rolling the same. Fig. 11 is an end view of said die. Fig. 12 is a side elevation of another pin for stove-door hinges with enlargement-ribs rolled in accordance with my improvements. Fig. 13 is a face view of the main portion of the die for rolling the same, and Fig. 14 is an end view of said die.

My improved dies may be used in any ordinary machine for rolling screw-threads in which two members or halves of a pair of dies have a relative reciprocation.

An example of a suitable machine within which to employ my dies may be found in my patent, No. 419,777, dated January 21, 1890. In connection with such a machine I employ a grooved die A for rolling what I term "enlargement-ribs" *a* on the body of the pin or screw under the head or shoulder *b* or at any point between said head and the opposite end of the bolt or pin. This die consists of two members in the form of straight die blocks or pieces of steel, the confronting faces of which are provided with grooves, as at *c*, the same being inclined slightly as they extend across the face of the die, whereby they are not parallel to the ends of the die or axis of the bolt or pin when it is being acted on by said dies, and the ribs produced are circumferential ribs in contradistinction to mere longitudinal ribs. This grooved portion may extend across the whole face of the block or die, as shown in Figs. 7 and 8, or, if desired, it may extend only part way across the face of the block or die, while the adjoining portion on the face of the die is left plain and of less projection, as at *d*, Figs. 3, 4, 13, and 14.

I have illustrated in the several drawings, which show the face view of the dies, only a portion of the length of the dies, the remaining portion of the dies (not shown) being only a continuation of like portions. I have only shown one member or half of each pair of dies; but the other member or companion part will be a duplicate of the one shown, the halves being placed face to face and confined so as to roll the bolt or pin between them under a reciprocating movement the same as in dies for rolling screw-threads. In connection with my dies for rolling the enlargement-ribs I generally employ dies B for rolling screw-threads, placing the die B by the side of the die A, thereby forming a compound die.

The dies B are grooved upon their face, as at *h*, for rolling the screw-thread *k*, and in operation the dies for rolling the thread and the enlargement-ribs will act together, whereby said threads and ribs will be simultaneously rolled. The bolts or pins may have any desired form of head or shoulder, three ordinary or known forms of which are shown in the drawings, and the threads and enlargement-ribs may be disposed at any desired position on the pin or bolt.

In Figs. 1 and 2 I have shown the bolts with a blank space between the rolled enlargement-ribs and screw-threads, and to produce these I place the threading-die B and the enlargement-rib-rolling die A side by side, with that edge of the die A having the plain depression *d* contiguous to the threading-die, as shown in Figs. 3 and 4, the width of said blank space or depression being in this case just equal to the blank space between the threads and enlargement-ribs of the bolt. If a greater space is desired, it would only be necessary to insert suitable strips or blocking between the dies, so as to separate the enlargement-rib-rolling die and the thread-rolling die the desired distance. The face of the threading-die may be of any desired width and may extend beyond the end of the bolt.

In Figs. 5 and 6 I have illustrated bolts with the screw-threads and enlarging ribs meeting each other, and in order to produce such a bolt it is only necessary to place the dies with the thread-rolling and enlarging-rib-rolling surfaces contiguous, as shown in Figs. 7 and 8.

In Fig. 9 I have shown a pin for stove-door hinges, in which the head or shoulder $b$ is located between the rolled enlargement-ribs and the rolled screw-thread. I roll these ribs and thread with the die shown in Figs. 10 and 11, in which it will be seen that the dies A and B have changed their position relative to that shown in the preceding figures, the die A being on the left and the die B on the right, instead of the reverse. Between the dies A and B a metal strip $m$ is inserted to form a space to accommodate the shoulder $h$, said strip of course being of less projection or height than the parts that are to act upon the pin. In the pin shown in Fig. 9 the portion having the enlargement-ribs was made slightly larger than the body $o$ of the pin when in the heading-machine, and consequently when rolled the bottom of the spaces between the enlargement-ribs are substantially flush with the body of the wire $o$. When such a blank is operated upon, the width of the grooved portion $c$ for raising the rolled ribs is immaterial, provided it is wide enough; or, in other words, it may be wider than the length of the enlargement-ribs. If, on the other hand, the spaces between the enlargement-ribs are deeper than the body of the rod in consequence of being made upon a blank which has not been previously enlarged, then the die should be made no wider than the length of the enlarging ribs, or if the die-block is wider it should be provided with a plain depressed portion, as at $d$ in the other figures.

In Fig. 12 I have shown a pin for stove-door hinges with enlargement-ribs rolled thereon, but without any screw-thread and as made from a blank which was of a uniform diameter under the head, the die-block being provided with a plain face or depression $d$, so as to make the portion $c$ for rolling the enlargement-ribs of a width proportionate to the length to be produced.

While I have shown the dies A and B as made of separate pieces, which is the preferred way, on account of convenience of construction and arranging them for acting upon different parts of the bolt or pin, it is of course evident that the dies A and B for any special work may be formed of one piece.

By my improvements I produce rolled enlargement-ribs under the head of a bolt or pin by swaging up said ribs in rolling-dies. I also simultaneously roll the thread and the enlarging ribs, so that the two may be made by one operation. Inasmuch as the thread-rolling dies form threads which extend transversely around the body of the screw, they have a continual action on the stock operated upon, so that whatever advantage there may be of this continuous hold upon the stock is utilized in rolling the enlarging ribs. By uniting the thread-rolling and the enlargement-rib-rolling dies together I form a new and useful compound die.

By making the grooves for enlargement-ribs extend across the dies on non-parallel lines to the axis of the bolt being acted on by said dies I obtain a better hold on the work and cause the dies to move evenly and smoothly.

The product produced by my process and dies is made the subject of another application of even date herewith.

I claim as my invention—

1. That improvement in the manufacture of bolts or pins which consists in simultaneously rolling the screw-threads and circumferential enlargement-ribs in dies, said threads and ribs both extending around the bolt on lines non-parallel to its axis, substantially as described, and for the purpose specified.

2. That improvement in the manufacture of bolts or headed pins which consists of rolling circumferential enlargement-ribs extending somewhat transversely to the axis of said bolts in dies on the body of the pin or bolt, substantially as described, and for the purpose specified.

3. The improved compound die herein shown and described, consisting of a grooved portion for rolling the thread and a grooved portion, with grooves out of parallel to a right-angular transverse line through said dies, for rolling the circumferential enlargement-ribs extending somewhat transversely to the axis of said bolts, the same being arranged side by side for simultaneously rolling said thread and enlargement-ribs, substantially as described, and for the purpose specified.

HORACE K. JONES.

Witnesses:
M. S. WIARD,
W. C. RUSSELL.